(12) United States Patent
Chen

(10) Patent No.: US 11,245,661 B2
(45) Date of Patent: Feb. 8, 2022

(54) DNS RESOLUTION METHOD, AUTHORITATIVE DNS SERVER AND DNS RESOLUTION SYSTEM

(71) Applicant: Wangsu Science & Technology Co., Ltd., Shanghai (CN)

(72) Inventor: Danjiang Chen, Shanghai (CN)

(73) Assignee: Wangsu Science & Technology Co., Ltd., Shanghai (CN)

(*) Notice: Subject to any disclaimer, the term of this patent is extended or adjusted under 35 U.S.C. 154(b) by 0 days.

(21) Appl. No.: 17/061,510

(22) Filed: Oct. 1, 2020

(65) Prior Publication Data
US 2021/0075762 A1    Mar. 11, 2021

Related U.S. Application Data

(63) Continuation of application No. PCT/CN2020/074967, filed on Feb. 12, 2020.

(30) Foreign Application Priority Data

Sep. 5, 2019  (CN) .......................... 201910838225.7

(51) Int. Cl.
    G06F 15/173    (2006.01)
    H04L 29/12    (2006.01)
(52) U.S. Cl.
    CPC .......... H04L 61/1511 (2013.01); H04L 61/10 (2013.01)
(58) Field of Classification Search
    CPC ............................ H04L 61/1511; H04L 61/10
    See application file for complete search history.

(56) References Cited

U.S. PATENT DOCUMENTS 8,347,100 B1 * 1/2013 Thornewell ............. H04L 63/08
                                                    713/176
8,832,283 B1    9/2014 Roskind et al.
(Continued)

FOREIGN PATENT DOCUMENTS

CN    102077189 A    5/2011
CN    201985882 U    9/2011
(Continued)

OTHER PUBLICATIONS

Mockapetris Isi P: " Domain Names—Implementation and Specification; rfc1035.txt", Domain Names—Implementation and Specification; RFC1035.TXT, Internet Engineering Task Force, IETF; Standard, Internet Society (ISOC) 4, Rue Des Falaises CH—1205 Geneva, Switzerland, Nov. 1, 1987 (Nov. 1, 1987), XP015005974, sect.*
Anonymous: "Domain Name System—Wikipedia", Aug. 31, 2016 (Aug. 31, 2016), XP055353784, Retrieved from the Internet: URL: https://en.wikipedia.org/w/index.php?title=Domain_Name_System&oldid=737118898 [retrieved on Mar. 10, 2017]*the whole document*.*

(Continued)

Primary Examiner — Thanh T Nguyen
(74) Attorney, Agent, or Firm — USCH Law, PC

(57) ABSTRACT

The present disclosure relates to domain name resolution technology and discloses a DNS resolution method, an authoritative DNS server and a DNS resolution system. In some embodiments, the authoritative DNS server receives a target domain name resolution request sent by a LDNS server, where the target domain name resolution request includes content information; the authoritative DNS server determines a target domain name resolution result according to the content information, and returns the target domain name resolution result to the LDNS server.

11 Claims, 2 Drawing Sheets

(56) References Cited

U.S. PATENT DOCUMENTS

| | | | |
|---|---|---|---|
| RE47,019 E * | 8/2018 | Thornewell | H04L 63/126 |
| 2009/0292824 A1* | 11/2009 | Marashi | H04L 61/1511 |
| | | | 709/247 |
| 2018/0375818 A1* | 12/2018 | Roberts, Jr. | H04L 67/02 |
| 2019/0182203 A1* | 6/2019 | Vig | H04M 15/8214 |
| 2019/0334926 A1* | 10/2019 | Fieau | H04L 63/123 |

FOREIGN PATENT DOCUMENTS

| | | | |
|---|---|---|---|
| CN | 105934930 A | | 9/2016 |
| CN | 108900648 A | | 11/2018 |
| CN | 109995887 A | | 7/2019 |
| CN | 110557464 A | | 12/2019 |
| WO | WO 2015/115952 A1 | | 8/2015 |

OTHER PUBLICATIONS

Wangsu Science & Technology Co., Ltd., First Office Action (CN), CN201910838225.7, dated Apr. 8, 2020, 9 pgs.

Wangsu Science & Technology Co., Ltd., Second Office Action (CN), CN201910838225.7, dated Sep. 18, 2020, 9 pgs.

Wangsu Science & Technology Co., Ltd., Extended European Search Report, EP2077606L2, dated May 18, 2021, 10 pgs.

Wangsu Science & Technology Co., Ltd., International Search Report, PCT/CN2020/074967, dated May 27, 2020, 4 pgs.

"Domain Name System," Online Article, Wikipedia, Aug. 31, 2016, 20 pgs.

Mockapetris, "Domain Names—Implementation and Specification," *Internet Society* (*ISOC*), Nov. 1, 1987, 56 pgs.

* cited by examiner

DNS RESOLUTION METHOD, AUTHORITATIVE DNS SERVER AND DNS RESOLUTION SYSTEM

CROSS REFERENCE TO RELATED APPLICATIONS

The present application is a continuation of PCT Application No. PCT/CN2020/074967, entitled "DNS RESOLUTION METHOD, AUTHORITATIVE DNS SERVER AND DNS RESOLUTION SYSTEM," filed Feb. 12, 2020, which claims priority to Chinese Patent Application No. 201910838225.7, entitled "DNS RESOLUTION METHOD, AUTHORITATIVE DNS SERVER AND DNS RESOLUTION SYSTEM," filed Sep. 5, 2019, each of which is incorporated by reference herein in its entirety.

TECHNICAL FIELD

The present disclosure relates to domain name resolution technologies, in particular to a DNS resolution method, an authoritative DNS server and a DNS resolution system.

BACKGROUND

Domain name resolution is to resolve a domain name into a corresponding IP address, so that a client may access the domain name and obtain the contents included in the domain name by accessing the IP address.

The client first sends a target domain name resolution request to a local DNS (LDNS) server when performing the domain name resolution. The LDNS server sends the target domain name resolution request to an authoritative DNS server for resolution if the LDNS server does not cache a target domain name resolution result. In the process of resolving a target domain name, both the LDNS server and the authoritative DNS server query the target domain name and take the IP addresses of all CDN servers, which provide services for the target domain name, as the target domain name resolution result.

During the implementation the present disclosure, the inventor finds that the existing technology at least has the following problems. Although the CDN server may provide services for the target domain name, it may not cache the content required by the client. In this case, the client still needs to obtain the required content through backing to source, thus increasing consumption of a back-to-source bandwidth.

SUMMARY

In order to solve the problems in the existing technology, certain embodiments of the present disclosure provide a DNS resolution method, an authoritative DNS server and a DNS resolution system, and the technical solutions are as follows.

In a first aspect, a DNS resolution method is provided, and the method includes:

receiving a target domain name resolution request sent by a LDNS server, where the target domain name resolution request includes content information; and determining a target domain name resolution result according to the content information, and returning the target domain name resolution result to the LDNS server.

For example, determining the target domain name resolution result according to the content information includes:

determining an A-record corresponding to the content information, and taking all A-records as the target domain name resolution result.

For example, before receiving the target domain name resolution request sent by the LDNS server, the method further includes:

pre-configuring the A-record corresponding to the content information locally.

For example, the method further includes:

calculating the number of target domain name resolution requests including the content information in the target domain name resolution requests received before a current time node as a historical request number of the content information;

determining the number of A-records corresponding to the content information as an A-record number of the content information;

adding the A-record corresponding to the content information if the historical request number is greater than or equal to a preset request number threshold and the A-record number is less than a preset maximum value of the A-record number; and deleting the A-record corresponding to the content information if the historical request number is less than the preset request number threshold and the A-record number is greater than a preset minimum value of the A-record number.

For example, the method further includes:

pre-configuring a relational table of the historical request number and the A-record number locally;

determining the A-record corresponding to the content information, and taking all the A-records as the target domain name resolution result includes:

calculating the number of target domain name resolution requests including the content information in the target domain name resolution requests received before the current time node as the historical request number of the content information;

determining the A-record number corresponding to the content information to be N from the relational table of the historical request number and the A-record number according to the historical request number;

selecting N A-records from all the A-records of a target domain name as the A-record corresponding to the content information; and taking all the A-records corresponding to the content information as the target domain name resolution result.

For example, the content information includes a URL corresponding to the target domain name resolution request.

In a second aspect, a DNS resolution method is provided, and the method includes:

receiving a target domain name resolution request sent by a client, where the target domain name resolution request includes content information;

determining a target domain name resolution result in a LDNS resolution record locally cached according to the content information, and sending the target domain name resolution result to the client; and forwarding the target domain name resolution request to an authoritative DNS server if the target domain name resolution result is not present in the LDNS resolution record locally cached.

For example, determining the target domain name resolution result in the LDNS resolution record locally cached according to the content information includes:

determining an IP address network segment of the client according to the target domain name resolution request;

querying all resolution records corresponding to the IP address network segment of the client in the LDNS resolution record locally cached;

determining the resolution record corresponding to the content information from all the resolution records corresponding to the IP address network segment of the client; and taking the resolution record corresponding to the content information as the target domain name resolution result.

For example, after forwarding the target domain name resolution request to the authoritative DNS server, the method further includes:

receiving the target domain name resolution result sent by the authoritative DNS server;

storing the target domain name resolution result in the LDNS resolution record; and forwarding the target domain name resolution result to the client.

In a third aspect, a DNS resolution method is provided, the method includes:

sending a target domain name resolution request to a LDNS server, where the target domain name resolution request includes content information so as to enable the LDNS server or an authoritative DNS server to determine a target domain name resolution result according to the content information; and receiving the target domain name resolution result returned by the LDNS server, and sending a target domain name data request to a CDN server corresponding to the target domain name resolution result according to the target domain name resolution result.

In a fourth aspect, an authoritative DNS server is provided, and the authoritative DNS server includes:

a transceiver module, configured to receive a target domain name resolution request from a LDNS server and return a target domain name resolution result to the LDNS server, where the target domain name resolution request includes content information; and a resolution module, configured to determine an A-record corresponding to the content information and take all A-records as the target domain name resolution result.

For example, the authoritative DNS server further includes a configuration module for pre-configuring the A-record corresponding to the content information or a relational table of a historical request number and an A-record number locally.

In a fifth aspect, an authoritative DNS server is provided, and the authoritative DNS server includes a memory and a processor, where the memory stores at least one instruction, at least one program, a code set or an instruction set, and the at least one instruction, the at least one program, the code set or the instruction set is loaded and executed by the processor to implement the DNS resolution method described in the first aspect.

In a sixth aspect, a DNS resolution system is provided, and the system includes a client, a LDNS server, and an authoritative DNS server, where the client is configured to perform the DNS resolution method described in the third aspect, the LDNS server is configured to perform the DNS resolution method described in the second aspect, and the authoritative DNS server is configured to perform the DNS resolution method described in the first aspect.

The technical solutions provided in the embodiments of the present disclosure have the following beneficial effects. In the embodiment of the present disclosure, the authoritative DNS server receives the target domain name resolution request sent by the LDNS server, where the target domain name resolution request includes the content information. The authoritative DNS server determines the target domain name resolution result according to the content information and returns the target domain name resolution result to the LDNS server. In this way, by adding the content information to the domain name resolution request, the authoritative DNS server may obtain a more accurate target domain name resolution result with respect to the content information included in the target domain name resolution request when resolving the target domain name, thereby ensuring that the CDN server to which the target domain name resolution result points stores an access content corresponding to the content information, so as to avoid the client from backing to source and reduce consumption of a back-to-source bandwidth.

BRIEF DESCRIPTION OF THE DRAWINGS

In order to illustrate the technical solutions in the embodiments of the present disclosure more clearly, the accompanying drawings used in the description of the embodiments are briefly described below. It is apparent that the drawings in the following description are only some embodiments of the present disclosure. For those of ordinary skills in the art, other drawings may also be obtained according to these drawings without any creative work.

DETAILED DESCRIPTION

In order to clarify objectives, technical solutions and advantages of the present disclosure, the embodiments of the present disclosure are described in details with reference to the accompany drawings.

An embodiment of the present disclosure provides a DNS resolution method, which may be realized by a client, a LDNS server and an authoritative DNS server together. Herein, the client may be a terminal device such as a personal computer, a smart phone, or the like. The client may obtain a target domain name resolution result through the LDNS server and the authoritative DNS server, and access a target domain name according to the target domain name resolution result. The LDNS server and the authoritative DNS server may resolve a target domain name resolution request sent by the client. A scenario of this embodiment may be that when a user performs content accesses including a file download, a video on demand, a live broadcast and the like on the target domain name through the client, the client sends the target domain name resolution request to the LDNS server and adds the content information to the target domain name resolution request. After receiving the target domain name resolution request, the LDNS server determines the target domain name resolution result in a local cache according to the content information included in the target domain name resolution request. If the target domain name resolution result is not present in the local cache, the LDNS server forwards the target domain name resolution request to the authoritative DNS server. The authoritative DNS server also determines the target domain name resolution result according to the content information included in the target domain name resolution request, and returns the target domain name resolution result to the LDNS server. After receiving the target domain name resolution result, the LDNS server caches the target domain name resolution result locally and forwards the target domain name resolution result to the client. In this way, the client may determine a target CDN server according to the target domain name resolution result after receiving the target domain name resolution result, and send subsequent data requests of the target domain name to the target CDN server.

Figure 1:
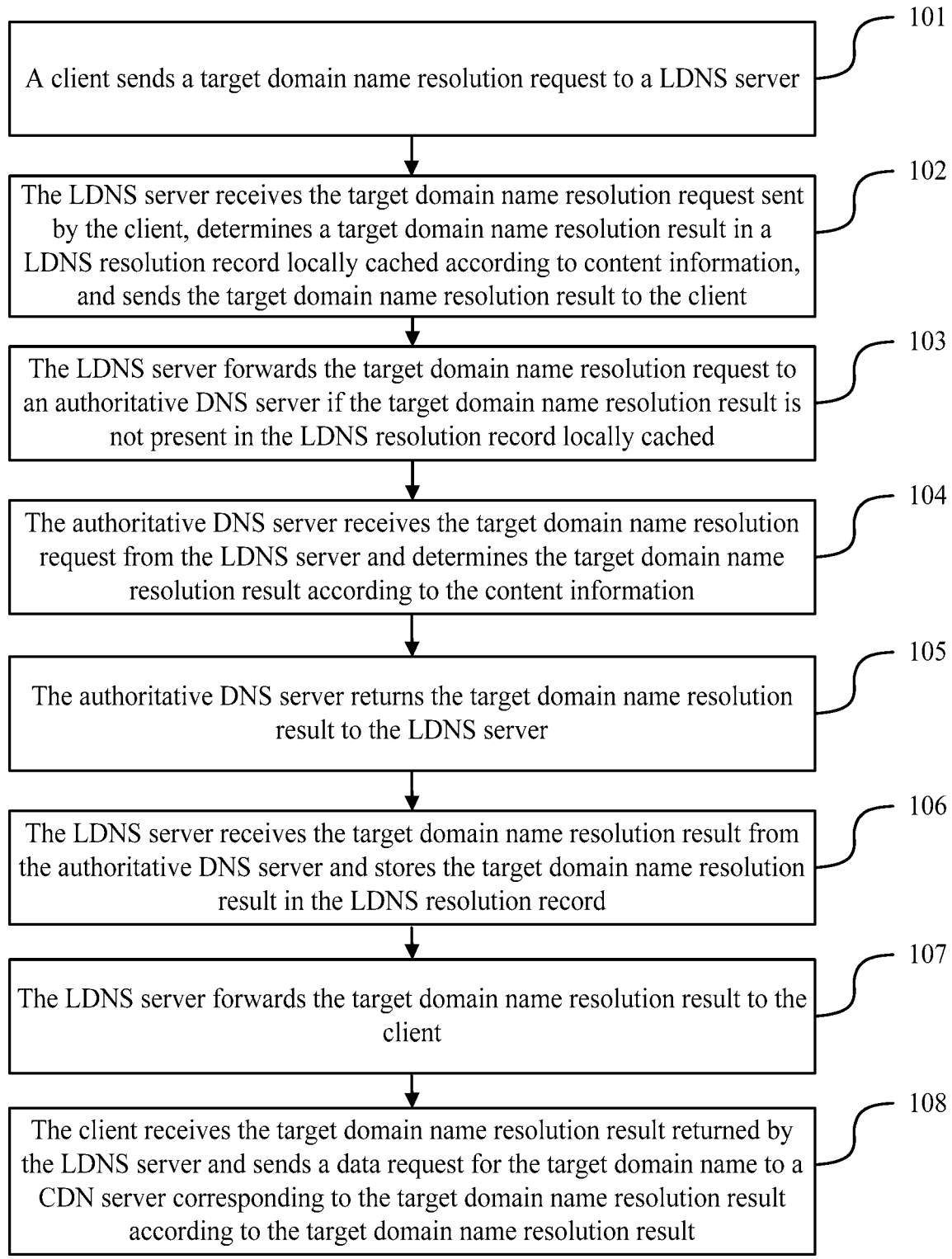
FIG. 1 is a flowchart of a DNS resolution method provided in an embodiment of the present disclosure.

A DNS resolution process shown in FIG. 1 is described in detail below with reference to a specific embodiment, and the content may be as follows.

In step 101, a client sends a target domain name resolution request to a LDNS server. The target domain name resolution request includes content information.

During implementation, when a user accesses the content under a target domain name through the client, the client sends the target domain name resolution request to the LDNS server first, and obtains an IP address of a CDN server providing services for the target domain name by performing a DNS resolution on the target domain name. Then the client may send a data request to the CDN server to obtain the user's access content to the target domain name. The client may add the content information of the access content to an additional block of the target domain name resolution request when constructing the target domain name resolution request. The content information may indicate the specific content desired by the user in subsequent data requests. Generally, a URL corresponding to the target domain name resolution request may be used as the content information. The URL may identify the access content's information such as a name, a domain name to which the access content belongs, a data path, and the like, so as to avoid confusion of the access content with the same name or the same data path under different domain names.

For example, when the user accesses http://app.wangsu.com/1.exe through the client, the client needs to perform the domain name resolution on the http://app.wangsu.com/1.exe, so as to obtain the IP address of the CDN server providing services for the target domain name app.wangsu.com. The client may add the URL (http://app.wangsu.com/1.exe) corresponding to the target domain name resolution request in the target domain name resolution request as the content information.

In step 102, the LDNS server receives the target domain name resolution request sent by the client, determines a target domain name resolution result in a LDNS resolution record locally cached according to the content information, and sends the target domain name resolution result to the client.

During implementation, the LDNS server is locally provided with the LDNS resolution record, and the LDNS resolution record is used to cache the resolution records of some domain names. The LDNS resolution record may be in the form of a DNS resolution table as shown in Table 1. As shown in Table 1, each of the resolution records in the DNS resolution table includes four contents including an IP address network segment of a client, domain name information, the content information and an A-record. It is certain that other contents may be added as required. The LDNS server obtains the content information included in the target domain name resolution request after receiving the target domain name resolution request from the client. The LDNS server determines the target domain name resolution result from the DNS resolution table according to the content information.

TABLE 1

| | DNS resolution table | | | |
|---|---|---|---|---|
| No. | IP address network segment of a client | Domain name information | Content information | A-record |
| 1 | 192.168.0.0/24 | App.wangsu.com | http://app.wangsu.com/1.exe | 1.1.1.1<br>2.2.2.2<br>3.3.3.3<br>4.4.4.4 |
| 2 | 192.168.0.0/24 | App.wangsu.com | http://app.wangsu.com/2.exe | 1.1.1.1 |
| 3 | 192.168.1.0/24 | App.wangsu.com | http://app.wangsu.com/2.exe | 1.1.1.1 |

In one embodiment, the target domain name resolution result is determined in the LDNS resolution record locally cached according to the content information, and a specific processing may be as follows. The IP address network segment of the client is determined according to the target domain name resolution request. All the resolution records corresponding to the IP address network segment of the client are searched in the LDNS resolution record locally cached. The resolution record corresponding to the content information is determined from all the resolution records corresponding to the IP address network segment of the client. And the resolution record corresponding to the content information is taken as the target domain name resolution result.

During implementation, the LDNS server obtains an IP address of the client (source IP address) and the content information from the target domain name resolution request after receiving the target domain name resolution request. The LDNS server obtains the IP address network segment of client corresponding to the IP address of the client through the IP address of the client. Then, referring to Table 1, the LDNS server queries with the IP address network segment of the client in the LDNS resolution record locally cached to obtain all the resolution records corresponding to the IP address network segment of the client. Then the LDNS server queries with the content information in all the resolution records corresponding to the IP address network segment of the client. If at least one resolution record is finally obtained, all the A-records included in the resolution record are the resolution records corresponding to the content information. The LDNS server takes these A-records as the target domain name resolution result.

For example, after receiving the target domain name resolution request from app.wangsu.com, the LDNS server obtains the IP address of the client (source IP address) 192.168.0.1 and the content information http://app.wangsu.com/1.exe from the target domain name resolution request. The LDNS server obtains a corresponding IP address network segment of the client 192.168.0.0/24 through the 192.168.0.1. The LDNS server queries fields of the IP address network segment in the DNS resolution table (Table 1) with the 192.168.0.0/24, and obtains two resolution records with serial numbers of 1 and 2. The LDNS server further queries fields of the content information with the http://app.wangsu.com/1.exe for the two resolution records. Finally, the resolution record with the serial number of 1 is obtained. The resolution record includes four A-records, i.e., 1.1.1.1, 2.2.2.2, 3.3.3.3 and 4.4.4.4, and these four A-records are the resolution records corresponding to the content information. The LDNS server takes these four A-records as the target domain name resolution result of the app.wangsu.com.

In step 103, the LDNS server forwards the target domain name resolution request to the authoritative DNS server if the target domain name resolution result is not present in the LDNS resolution record locally cached.

During implementation, in the process of the LDNS server querying through the above method, if the resolution record corresponding to the IP address network segment of the client is not present in the LDNS resolution record locally cached, or if the resolution record corresponding to the content information is not present in all the resolution records corresponding to the IP address network segment of the client, it is indicated that the target domain name resolution result is not present in the resolution record locally cached by the LDNS server. Therefore, the LDNS server forwards the target domain name resolution request to the authoritative DNS server, so that the authoritative DNS server resolves the target domain name and obtains the target domain name resolution result.

In step 104, the authoritative DNS server receives the target domain name resolution request from the LDNS server and determines the target domain name resolution result according to the content information.

During implementation, the LDNS server forwards the target domain name resolution request to the authoritative DNS server after the target domain name resolution result is unable to be obtained locally. The authoritative DNS server receives the target domain name resolution request and obtains the content information included in the target domain name resolution request. After that, the authoritative DNS server determines the target domain name resolution result according to the content information.

In one embodiment, when the client sends a data request for the target domain name to the CDN server according to the target domain name resolution result, the CDN server may not store the content required by the client, which results in the need for the client to back to source so as to obtain the content. In order to prevent this, a corresponding processing may be as follows. The A-record corresponding to the content information is determined and all the A-records are taken as the target domain name resolution result.

During implementation, the authoritative DNS server stores a large number of the A-records of the target domain name. If these A-records are directly sent to the client as the target domain name resolution result, the client may need to back to source when sending the data request for the target domain name to the CDN servers corresponding to the A-records according to the target domain name resolution result, because these CDN servers may not store the content required by the client. In order to prevent this, a processing similar to the LDNS server may be adopted. The authoritative DNS server obtains the content information from the target domain name resolution request, and then determines all the A-records of the target domain name, and further determines the A-record corresponding to the content information from all the A-records of the target domain name, and takes all the A-records corresponding to the content information as the target domain name resolution result.

In one embodiment, since the authoritative DNS server stores a large number of the A-records of the target domain name, in order to more accurately send the A-record corresponding to the CDN server that caches the content required by the client to the client as the target domain name resolution result, a corresponding processing may be as follows. The A-record corresponding to the content information is pre-configured locally.

During implementation, the authoritative DNS server may pre-configure the A-record corresponding to the content information locally, that is, the A-record of the CDN server storing the content corresponding to the content information is taken as the A-record corresponding to the content information. When receiving the domain name resolution request, the authoritative DNS server may obtain the content information from the domain name resolution request, and then obtain a corresponding A-record according to the content information. In this way, it may be ensured as far as possible that the client may obtain the content from the CDN server corresponding to the target domain name resolution result when sending the data request to obtain the content under the target domain name according to the target domain name resolution result, thus preventing of the client from backing to source.

In one embodiment, the number of the A-records corresponding to the content information may be dynamically adjusted to save the bandwidth and avoid wasting the sources of the CDN server, and a corresponding processing may be as follows. The number of the target domain name resolution requests including the content information in the target domain name resolution requests received before a current time node is calculated as a historical request number of the content information. The number of the A-records corresponding to the content information is determined as an A-record number of the content information. The A-record corresponding to the content information is added if the historical request number is greater than or equal to a preset request number threshold and the A-record number is less than a preset maximum value of the A-record number. And the A-record corresponding to the content information is deleted if the historical request number is less than the preset request number threshold and the A-record number is greater than a preset minimum value of the A-record number.

During implementation, after returning the target domain name resolution result to the LDNS server, the authoritative DNS server may take the current time as a node to calculate the number of the target domain name resolution requests including the same content information in the previously received target domain name resolution requests, and take an obtained result as the historical request number of the content information. The authoritative DNS server may also count the number of the A-records corresponding to the content information and take the obtained result as the A-record number of the content information.

The authoritative DNS server compares the historical request number with the preset request number threshold. If the historical request number is greater than or equal to the preset request number threshold, it means that the access content corresponding to the content information has a higher access demand, and the A-record number corresponding to the content information may be increased. In this way, the authoritative DNS server may return more A-records to the client according to the target domain name resolution result. Therefore, more CDN servers may be selected when the client subsequently sends the data request for the target domain name and obtains the access content, thereby reducing the load of a single CDN server and improving load-carrying capacity and performance of the CDN server. However, if the A-record number is increased without limit, a large number of CDN servers may cache the access content, the load of the single CDN server may be excessively low, CDN server resources may be wasted, and even the access content may be deleted by the CDN server due to an insufficient access amount, thus resulting in the need for the client to back to source so as to obtain the access content. Therefore, the maximum value of the A-record number may also be preset, and the authoritative DNS server compares the A-record number of the content information with the preset maximum value of the A-record number. The A-record corresponding to the content information may be added if the A-record number of the content information is less than the preset maximum value of the A-record number. And the A-record corresponding to the content information does not need to be processed if the A-record number of the content information is greater than or equal to the preset maximum value of the A-record number.

Similarly, if the historical request number is less than the preset request number threshold, it means that the access content corresponding to the content information has a lower access demand and the A-record number corresponding to the content information may be decreased. In this way, the authoritative DNS server may return fewer A-records to the client according to the target domain name resolution result, thus concentrating the access content with the lower access demand in one or several CDN servers. In this way, the access amount of such access content on the single CDN server may be increased, and the deletion of such access content by the CDN server may be avoided, thus avoiding the client from backing to source. At the same time, a cache space of other CDN servers may also be saved. It is certain that the A-record number corresponding to the content information may eventually be zero if the A-record number is reduced without limit, which may result in the need for the client to back to source every time so as to obtain the access content. Therefore, the minimum value of the A-record number may also be preset, and the authoritative DNS server compares the A-record number of the content information with the minimum value of the A-record number. The A-record corresponding to the content information may be deleted if the A-record number of the content information is greater than the preset minimum value of the A-record number. And the A-record of the content information does not need to be processed if the A-record number of the content information is less than or equal to the preset minimum value of the A-record number. It should be noted that, as mentioned above, the minimum value of the A-record number should be greater than or equal to 1, and the minimum value of the A-record number should not be set too small, otherwise it may lead to an excessive access amount and a too-high load of the CDN servers that stores such access content.

In one embodiment, the authoritative DNS server may also pre-configure a relational table of the historical request number and the A-record number locally, and then determine the target domain name resolution result according to the relational table of the historical request number and the A-record number, and a corresponding processing may be as follows. The number of the target domain name resolution requests including the content information in the target domain name resolution requests received before the current time node may be calculated as the historical request number of the content information. The A-record number corresponding to the content information may be determined from the relational table of the historical request number and the A-record number to be N according to the historical request number. N A-record(s) may be selected from all the A-records of the target domain name as the A-record corresponding to the content information. And all the A-record(s) corresponding to the content information may be taken as the target domain name resolution result.

During implementation, the authoritative DNS server may also pre-configure the relational table of the historical request number and the A-record number locally (as shown in Table 2). After obtaining the content information from the target domain name resolution request, the authoritative DNS server takes the current time as a node to calculate the number of the target domain name resolution requests including the same content information in the previously received target domain name resolution requests, and takes the obtained result as the historical request number of the content information. After that, the authoritative DNS server queries the relational table of the historical request number and the A-record number to find the A-record number related to the historical request number as the A-record number N corresponding to the content information. The authoritative DNS server selects N A-record(s) from all the A-records of the target domain name as the A-record corresponding to the content information according to a preset selection rule (such as random, forward order, reverse order, weight and the like). The authoritative DNS server takes the A-record corresponding to the content information as the target domain name resolution result.

TABLE 2

A relational table of historical request number and A-record number

| Historical request number | A-record number (N) |
|---|---|
| 0-10 | 1 |
| 11-100 | 3 |
| 101-500 | 5 |
| 501-1000 | 10 |

In step 105, the authoritative DNS server returns the target domain name resolution result to the LDNS server.

During implementation, after obtaining the target domain name resolution result, the authoritative DNS server returns the target domain name resolution result to the LDNS server, so that the LDNS server forwards the target domain name resolution result to the client.

In step 106, the LDNS server receives the target domain name resolution result from the authoritative DNS server and stores the target domain name resolution result in the LDNS resolution record.

During implementation, the authoritative DNS server sends the target domain name resolution result to the LDNS server after obtaining it. The LDNS server receives the target domain name resolution result and stores the target domain name resolution result in the LDNS resolution record locally cached by the LDNS server described above. In this way, the target domain name resolution result corresponding to the target domain name resolution request may be obtained from the LDNS resolution record locally cached when the LDNS server receives the target domain name resolution request again.

In step 107, the LDNS server forwards the target domain name resolution result to the client.

During implementation, after storing the target domain name resolution result, the LDNS server forwards the target domain name resolution result to the client.

In step 108, the client receives the target domain name resolution result returned by the LDNS server and sends the data request for the target domain name to the CDN server corresponding to the target domain name resolution result according to the target domain name resolution result.

During implementation, after receiving the target domain name resolution result returned by the LDNS server, the client may select an IP address from the target domain name resolution result as a destination IP address, and send the data request for the target domain name to the CDN server corresponding to the destination IP address to access the content under the target domain name.

In the embodiment of the present disclosure, the authoritative DNS server receives the target domain name resolution request sent by the LDNS server, and the target domain name resolution request includes the content information. The authoritative DNS server determines the target domain name resolution result according to the content information and returns the target domain name resolution result to the LDNS server. In this way, by adding the content information to the domain name resolution request, the authoritative DNS server may obtain a more accurate target domain name resolution result with respect to the content information included in the target domain name resolution request when resolving the target domain name, thereby ensuring that the CDN server to which the target domain name resolution result points stores an access content corresponding to the content information, so as to avoid the client from backing to source and reduce consumption of a back-to-source bandwidth.

Figure 2:
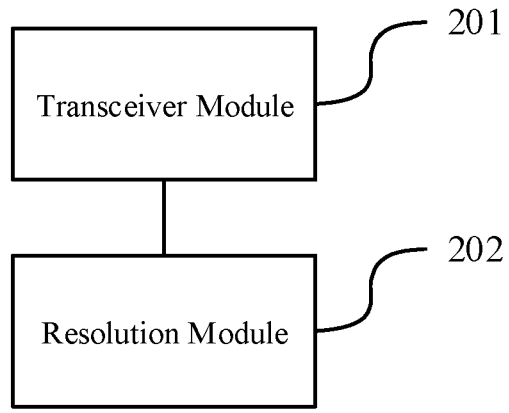
FIG. 2 is a schematic structural diagram of an authoritative DNS server provided in an embodiment of the present disclosure.

Based on the same technical concept, an embodiment of the present disclosure further provides an authoritative DNS server, as shown in FIG. 2, which includes:

a transceiver module 201, configured to receive a target domain name resolution request from a LDNS server and return a target domain name resolution result to the LDNS server, where the target domain name resolution request includes content information; and a resolution module 202, configured to determine an A-record corresponding to the content information and take all the A-records as the target domain name resolution result.

Figure 3:
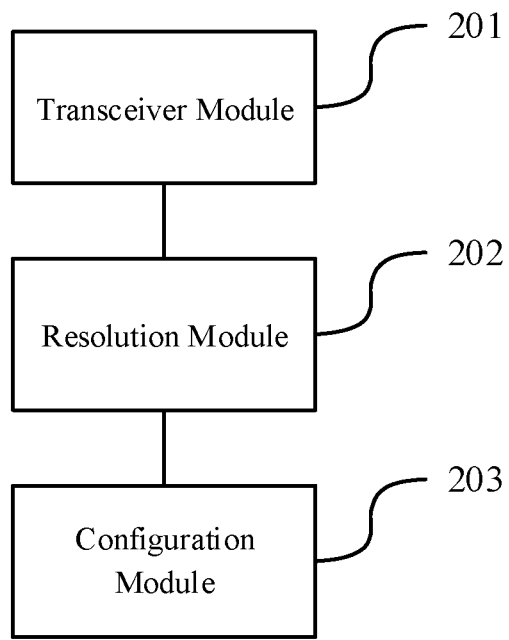
FIG. 3 is another schematic structural diagram of an authoritative DNS server provided in an embodiment of the present disclosure.

In one embodiment, as shown in FIG. 3, the authoritative DNS server further includes a configuration module 203 for pre-configuring the A-record corresponding to the content information or a relational table of a historical request number and an A-record number locally.

Based on the same technical concept, an embodiment of the present disclosure further provides an authoritative DNS server. The authoritative DNS server may have large differences due to different configurations or performances, which includes one or more memories and processors. Herein, the memory may be capable of temporary storage or permanent storage. The memory may store at least one instruction, at least one program, a code set or an instruction set, and the at least one instruction, the at least one program, the code set or the instruction set is loaded and executed by the processor to perform the DNS resolution method described above.

Based on the same technical concept, an embodiment of the present disclosure further provides a DNS resolution system. The DNS resolution system includes a client, a LDNS server and an authoritative DNS server, and the client, the LDNS server and the authoritative DNS server are configured to perform the DNS resolution method described above.

It should be noted that when implementing the DNS resolution, the authoritative DNS server provided in the above embodiment is only illustrated by the division of the above functional modules as an example. In practical applications, the functions described above may be assigned to different functional modules for completion as needed, that is, an internal structure of the authoritative DNS server is divided into different functional modules to complete all or some of the functions described above. At the same time, the authoritative DNS server provided in the above embodiments and the embodiments of the DNS resolution method belong to the same concept. A specific implementation process of the authoritative DNS server is detailed in the method embodiments, which is not repeated herein.

From the description of the above embodiments, those skilled in the art may clearly understand that each of the embodiments may be implemented by means of a software plus a necessary general hardware platform, and of course, may further be implemented by means of a hardware. Based on such understanding, the essence of the above technical solutions or the part contributing to the existing technology may be embodied in the form of a software product. The computer software product may be stored in a computer readable storage medium such as a ROM/RAM, a magnetic disk, an optical disk or the like, and may include several instructions to cause a computer device (which may be a personal computer, a server, a network device, or the like.) to perform the method described in each of the embodiments or some parts of the embodiment.

The above are only preferred embodiments of the present disclosure, which are not intended to limit the present disclosure. Any modifications, equivalent substitutions, improvements or the like made within the spirit and principles of the present disclosure shall be included in the protection scope of the present disclosure.

What is claimed is:

1. A domain name system (DNS) resolution method, applied at an authoritative DNS server, comprising: receiving a target domain name resolution request sent by a local DNS (LDNS) server, wherein the target domain name resolution request includes content information; determining a target domain name resolution result according to the content information; and returning the target domain name resolution result to the LDNS server; wherein determining the target domain name resolution result according to the content information comprises: determining an A-record corresponding to the content information, wherein the A-record corresponding to the content information is a resolution record corresponding to the content information; determining a historical request number of the content information, the historical request number of the content information corresponding to a number of target domain name resolution requests including the content information among target domain name resolution requests received before a current time node; determining an A-record number of the content information, the A-record number of the content information being a number of A-records corresponding to the content information; adding the A-record corresponding to the content information if the historical request number is greater than or equal to a preset request number threshold and the A-record number of the content information is less than a preset maximum value for the A-record number; and deleting the A-record corresponding to the content information if the historical request number is less than the preset request number threshold and the A-record number of the content information is greater than a preset minimum value for the A-record number; wherein, before receiving the target domain name resolution request sent by the LDNS server, the method further comprises pre-configuring the A-record corresponding to the content information locally.

2. The method according to claim 1, wherein the method further comprises: pre-configuring a relational table of a historical request number locally; and selecting, from all A-records of the target domain name, at least one A-record as a target domain name resolution result; wherein the number of the at least one A-record is determined from the relational table of the historical request number and the A-record number according to the historical request number of the content information.

3. The method according to claim 1, wherein the content information comprises a URL corresponding to the target domain name resolution request.

4. A domain name system (DNS) resolution method, comprising: receiving, by a local DNS (LDNS) server, a target domain name resolution request sent by a client, wherein the target domain name resolution request includes content information; determining, by the LDNS server, a target domain name resolution result in a LDNS resolution record locally cached according to the content information, and sending the target domain name resolution result to the client; and forwarding, by the LDNS server, the target domain name resolution request to an authoritative DNS server if the target domain name resolution result is not present in the LDNS resolution record locally cached; wherein the method further comprises, at the authoritative DNS server: receiving the target domain name resolution request sent by the LDNS server; determining a target domain name resolution result according to the content information; and returning the target domain name resolution result to the LDNS server; wherein determining the target domain name resolution result according to the content information comprises: determining an A-record corresponding to the content information, wherein the A-record corresponding to the content information is a resolution record corresponding to the content information; determining a historical request number of the content information, the historical request number of the content information corresponding to a number of target domain name resolution requests including the content information among target domain name resolution requests received before a current time node; determining an A-record number of the content information, the A-record number of the content information being a number of A-records corresponding to the content information; adding the A-record corresponding to the content information if the historical request number is greater than or equal to a preset request number threshold and the A-record number of the content information is less than a preset maximum value for the A-record number; and deleting the A-record corresponding to the content information if the historical request number is less than the preset request number threshold and the A-record number of the content information is greater than a preset minimum value for the A-record number; wherein, before receiving the target domain name resolution request sent by the LDNS server, the method further comprises pre-configuring the A-record corresponding to the content information locally.

5. The method according to claim 4, wherein determining the target domain name resolution result in the LDNS resolution record locally cached according to the content information comprises: determining, by the LDNS server, an IP address network segment of the client according to the target domain name resolution request; searching, by the LDNS server, all resolution records corresponding to the IP address network segment of the client in the LDNS resolution record locally cached; determining, by the LDNS server, the resolution record corresponding to the content information from all the resolution records corresponding to the IP address network segment of the client; and taking, by the LDNS server, the resolution record corresponding to the content information as the target domain name resolution result.

6. The method according to claim 4, wherein after forwarding the target domain name resolution request to the authoritative DNS server, the method further comprises: receiving, by the LDNS server, the target domain name resolution result sent by the authoritative DNS server; storing, by the LDNS server, the target domain name resolution result in the LDNS resolution record; and forwarding, by the LDNS server, the target domain name resolution result to the client.

7. The method according to claim 4, wherein the content information is added in an additional block of the target domain name resolution request by the client when the client constructs the target domain name resolution request; and the content information indicates a specific content desired by a user in a subsequent data request.

8. The method according to claim 4, wherein the content information comprises a URL corresponding to the target domain name resolution request.

9. An authoritative domain name system (DNS) server, comprising a memory and a processor, wherein the memory stores at least one instruction, at least one program, a code set or an instruction set, and the at least one instruction, the at least one program, the code set or the instruction set is loaded and executed by the processor to perform a DNS resolution method; wherein the method comprises: receiving a target domain name resolution request sent by a local DNS (LDNS) server, wherein the target domain name resolution request includes content information; and determining a target domain name resolution result according to the content information, and returning the target domain name resolution result to the LDNS server; wherein determining the target domain name resolution result according to the content information comprises: determining an A-record corresponding to the content information, wherein the A-record corresponding to the content information is a resolution record corresponding to the content information; determining a historical request number of the content information, the historical request number of the content information corresponding to a number of target domain name resolution requests including the content information among target domain name resolution requests received before a current time node; determining an A-record number of the content information, the A-record number of the content information being a number of A-records corresponding to the content information; adding the A-record corresponding to the content information if the historical request number is greater than or equal to a preset request number threshold and the A-record number of the content information is less than a preset maximum value for the A-record number; and deleting the A-record corresponding to the content information if the historical request number is less than the preset request number threshold and the A-record number of the content information is greater than a preset minimum value for the A-record number; wherein, before receiving the target domain name resolution request sent by the LDNS server, the method further comprises pre-configuring the A-record corresponding to the content information locally.

10. The authoritative DNS server according to claim 9, wherein the method further comprises: pre-configuring a relational table of a historical request number locally; selecting, from all A-records of the target domain name, at least one A-record as a target domain name resolution result; wherein the number of the at least one A-record is determined from the relational table of the historical request number and the A-record number according to the historical request number of the content information.

11. The authoritative DNS server according to claim 9, wherein the content information comprises a URL corresponding to the target domain name resolution request.

* * * * *